(12) United States Patent
Clarke et al.

(10) Patent No.: US 11,820,447 B2
(45) Date of Patent: Nov. 21, 2023

(54) SHROUDS FOR GROUSER PROTECTORS IN TRACK SHOES AND GROUSER SHROUD INVENTORY

(71) Applicant: Caterpillar Inc., Peoria, IL (US)

(72) Inventors: Donovan Stuart Clarke, East Peoria, IL (US); Paul Prest, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 377 days.

(21) Appl. No.: 17/165,710

(22) Filed: Feb. 2, 2021

(65) Prior Publication Data

US 2022/0242504 A1 Aug. 4, 2022

(51) Int. Cl.
*B62D 5/28* (2006.01)
*B62D 55/32* (2006.01)
*B62D 55/28* (2006.01)
*B62D 55/26* (2006.01)

(52) U.S. Cl.
CPC ........... *B62D 55/28* (2013.01); *B62D 55/32* (2013.01); *B62D 55/26* (2013.01)

(58) Field of Classification Search
CPC ...... B62D 55/26; B62D 55/28; B62D 55/286; B62D 55/32
See application file for complete search history.

(56) References Cited

U.S. PATENT DOCUMENTS

| 2,874,005 A * | 2/1959 | Engstrom | B62D 55/28 29/891.1 |
|---|---|---|---|
| 3,912,338 A | 10/1975 | Toews | |
| 3,972,570 A | 8/1976 | Massieon | |
| 5,897,177 A | 4/1999 | Bergstrom | |
| 6,017,103 A | 1/2000 | Villard | |
| 8,678,522 B2 | 3/2014 | Fischer et al. | |
| 2019/0061845 A1* | 2/2019 | Delisle | B62D 55/26 |

FOREIGN PATENT DOCUMENTS

| CA | 2338609 A1 * | 8/2002 | ............ B62D 55/26 |
| KR | 20000046435 A | 7/2000 | |
| WO | WO-2008155423 A1 * | 12/2008 | ............ B62D 55/26 |
| WO | 2021150352 | 7/2021 | |

* cited by examiner

Primary Examiner — Kip T Kotter

(57) ABSTRACT

A shroud for a track shoe grouser protector includes an elongate shroud body having weld holes formed in a first shroud leg and a second shroud leg attached to a base in the elongate shroud body. The shroud may have a fore to aft profile having the form of a flat-crowned arch with the shroud legs flared outward to form a grouser opening for positioning the shroud upon a track shoe grouser in a ground-engaging track system. An inventory of shrouds includes long shrouds and short shrouds positionable in a plurality of different assembly combinations to shield grousers in track shoes having a range of sizes.

20 Claims, 5 Drawing Sheets

SHROUDS FOR GROUSER PROTECTORS IN TRACK SHOES AND GROUSER SHROUD INVENTORY

TECHNICAL FIELD

The present disclosure relates generally to a shroud for a track shoe grouser protector in a ground-engaging track system, and more particularly to shrouds positionable in different assembly combinations to shield track shoe grousers having a range of lengths.

BACKGROUND

Ground-engaging track systems are used with a variety of ground-engaging machinery throughout the world for applications such as construction, road building, forestry, landfills, materials handling, mining, and still others. A typical ground-engaging track system includes an endless loop of track shoes attached to track links that extend about a drive sprocket and one or more idlers. Operating conditions for ground-engaging track systems can be quite harsh, and many such systems include sophisticated lubrication strategies, materials and design of components, and servicing procedures and schedules to mitigate and normalize wear between and among track system components while providing optimal field service performance.

Track systems, and notably track shoes, operating in very hard applications such as diamond mines and/or granite mines, for example, can have a tendency to wear out relatively rapidly. Track shoes are often equipped with a grouser that projects from a track shoe plate and penetrates more or less vertically into a substrate or rides upon the substrate where the substrate material is sufficiently hard or compacted to support the weight of the machine. Track shoe grouser wear can affect performance or require track shoe replacement at a frequency greater than desired.

One effort to counteract abrasive wear conditions is set forth in U.S. Pat. No. 8,678,522 to Fischer et al, where a capping surface structure defining an abrasion resistant surface covering is disposed in covering relation to a distal edge surface of a track shoe grouser. Covering segments of the structure intersect to apparently define a horseshoe shaped profile. The capping surface structure may be formed using hard facing techniques where particles of a wear-resistant material are deposited into a liquid pool of molten metal across the surface of the grouser to yield a composite alloy with enhanced wear resistance. While the technique set forth in the '522 patent is expected to have various advantages, there is always room for improvement and development of alternative strategies.

SUMMARY OF THE INVENTION

In one aspect, a shroud for a track shoe grouser protector in a ground-engaging track system includes an elongate shroud body having a first shroud end and a second shroud end, a base, and a first shroud leg and a second shroud leg, each extending longitudinally from the first shroud end to the second shroud end. The base includes an outside base surface, and an inside base surface that is planar and defines a horizontal plane, and each of the first shroud leg and the second shroud leg includes an outside leg surface and an inside leg surface. The first shroud leg and the second shroud leg extend downwardly from the base, and a vertical plane bisects the base fore and aft between the first shroud leg and the second shroud leg. The elongate shroud body has a profile that is symmetric fore to aft about the vertical plane. The first shroud leg and the second shroud leg flare outwardly from the base, relative to the vertical plane, and define a grouser opening, for fitting the shroud upon a grouser in a track shoe, and weld holes are formed in each of the first shroud leg and the second shroud leg and extend between the respective outside leg surface and inside leg surface.

In another aspect, a shroud for a track shoe grouser protector in a ground-engaging track system includes an elongate shroud body having a first shroud end and a second shroud end, a base, and a first shroud leg and a second shroud leg, each extending longitudinally from the first shroud end to the second shroud end. The base includes an outside base surface, and an inside base surface that is planar and defines a horizontal plane, and each of the first shroud leg and the second shroud leg includes an outside leg surface and an inside leg surface. The first shroud leg and the second shroud leg extend downwardly from the base to a first longitudinal peripheral edge and a second longitudinal peripheral edge, respectively, and a vertical plane bisects the base fore to aft between the first shroud leg and the second shroud leg, and the elongate shroud body forms a fore to aft profile about the vertical plane having the form of a flat-crowned arch.

In still another aspect, a track shoe grouser shroud inventory includes a long shroud having a base, a first shroud leg and a second shroud leg extending downwardly from the base, a grouser opening formed between the first shroud leg and the second shroud leg, and defining a long shroud length from a first shroud end to a second shroud end. The grouser shroud inventory further includes a short shroud having a base, a first shroud leg and a second shroud leg extending downwardly from the base, and a grouser opening formed between the respective first shroud leg and second shroud leg, and defining a short shroud length from a first shroud end to a second shroud end. The long shroud has a profile that is symmetric fore and aft about a vertical plane bisecting the base between the respective first leg and second leg, and the short shroud has a profile identical in form to the profile of the long shroud. A ratio of the long shroud length to the short shroud length is from 139% to 162%.

DETAILED DESCRIPTION

Figure 1:
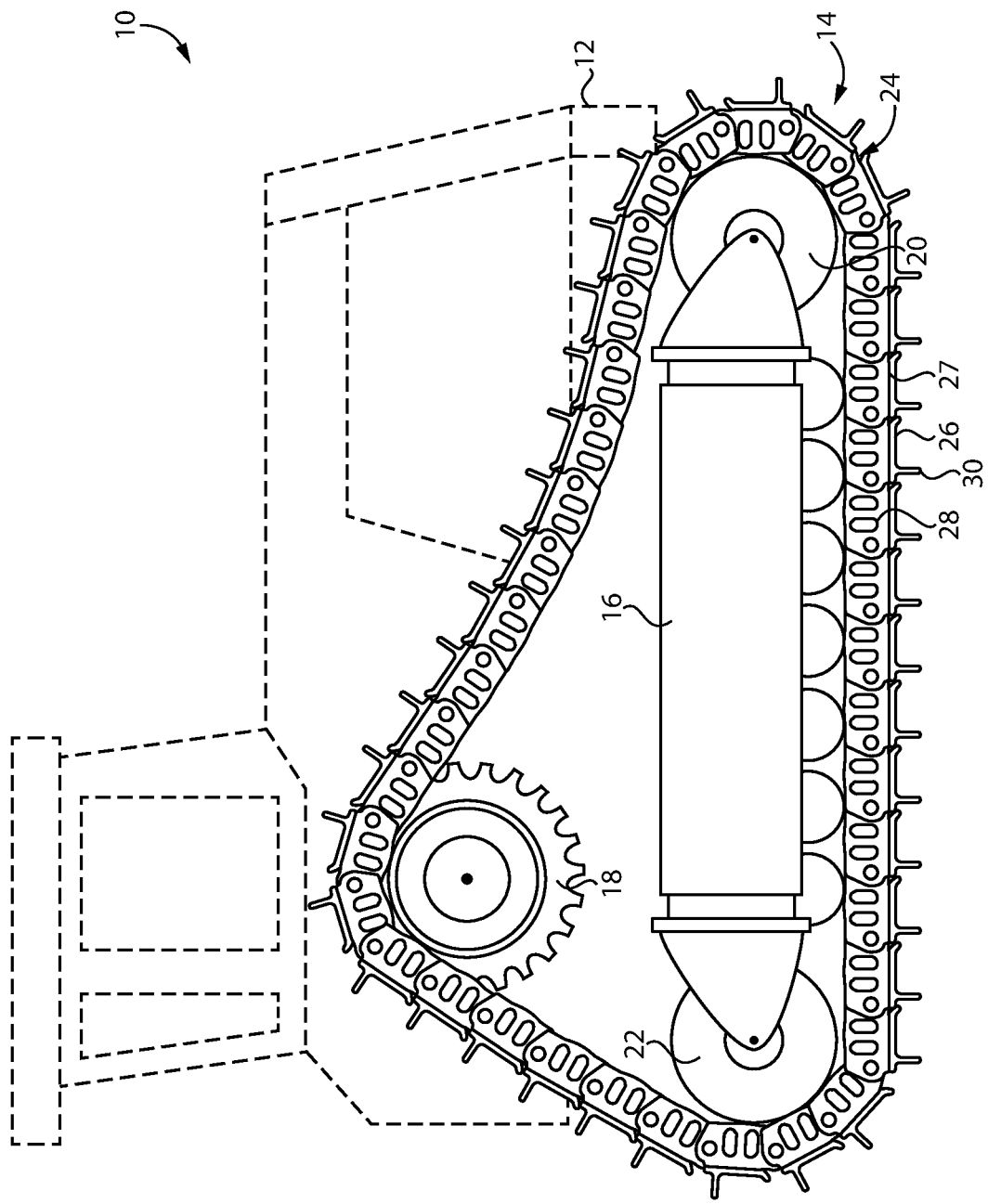
FIG. 1 is a side diagrammatic view of a machine, according to one embodiment.

Referring to FIG. 1, there is shown a machine 10, according to one embodiment. Machine 10 is shown in the context of a track-type tractor and includes a frame 12 and a ground-engaging track system 14 supporting frame 12. Ground-engaging track system 14 includes a track roller frame 16, a drive sprocket 18, a front idler 20, a back idler 22, and a ground-engaging track 24 forming an endless loop extending about drive sprocket 18, front idler 20, and back idler 22. Ground-engaging track 24 includes one track of two tracks that will typically be part of ground-engaging track system 14, with one of the tracks positioned at each of a left side and a right side of machine 10. Ground-engaging track system 14 is shown with drive sprocket 18 in a so-called "high drive" configuration. In other instances, ground-engaging track system 14 could include an oval track configuration, a half-track configuration, or still others. Ground-engaging track 24 includes a plurality of track shoes 26 attached to track links 28, typically forming two track link chains, one of which is visible in FIG. 1. Track shoes 26, hereinafter referred to at times in the singular, can be "standard" track shoes, with ground-engaging track 24 also equipped with one or more master shoes 27 somewhat different in design and construction and attached to a master track link. Each of track shoes 26 and one or more master shoes 27 can be equipped with a grouser 30, projecting from a shoe plate, and generally oriented to penetrate into a ground surface. As suggested above, track shoe grousers can be subjected to extreme wear conditions in at least certain applications. As will be further apparent from the following description, ground-engaging track system 14 may be equipped with apparatus for shielding grousers 30 to provide for an extended service life and overall mitigation of track system wear.

Figure 3:
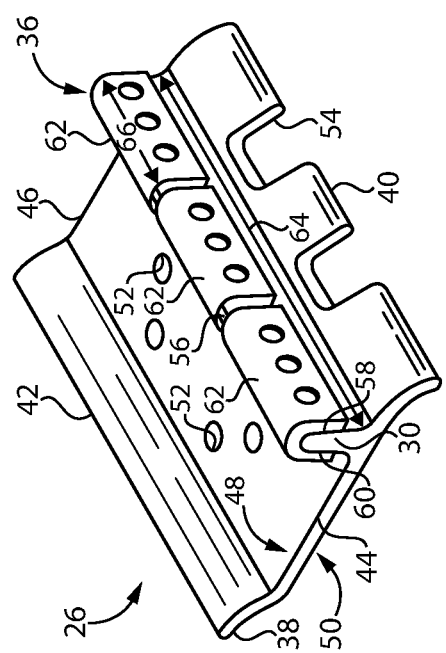
FIG. 3 is a diagrammatic view of a track shoe, according to one embodiment.
Figure 2:
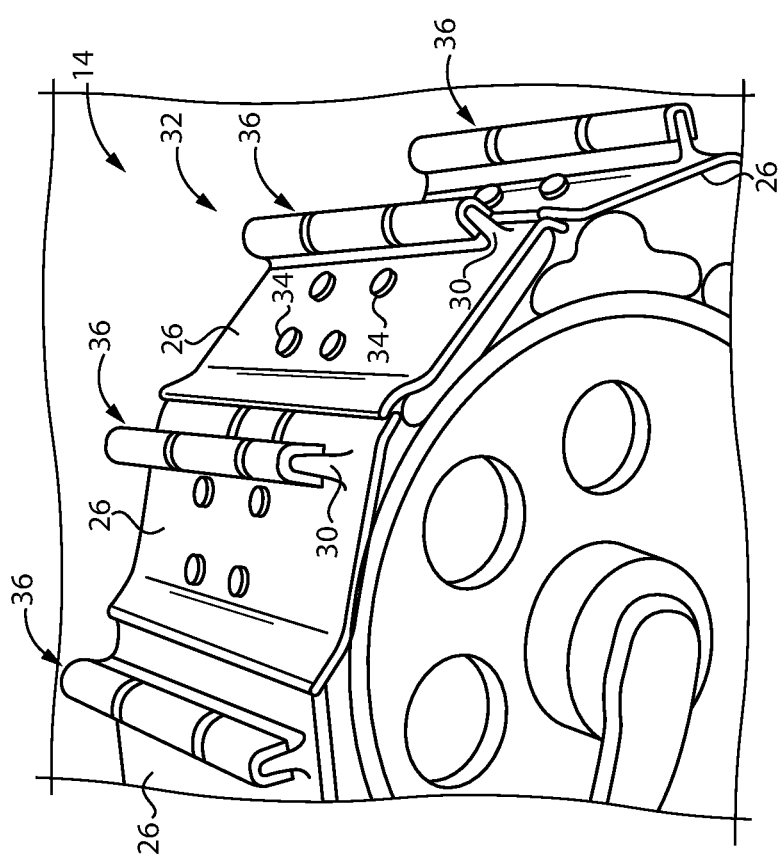
FIG. 2 is a diagrammatic view, in perspective, of a portion of a ground-engaging track system, according to one embodiment.

Referring also now to FIGS. 2 and 3, there are shown features of ground-engaging track system 14 and a track shoe 26 in further detail. Track shoe 26 includes a track shoe body or shoe plate 38 having a forward edge 40, a back edge 42, a first lateral edge 44, and a second lateral edge 46. Forward edge 40 may be downturned relative to a plane defined by track shoe body 38, and back edge 42 upturned relative to the plane, in at least some embodiments. Cutouts 54 may be formed in forward edge 40 to accommodate portions of ground-engaging track system 14 as track shoe 26 rotates in ground-engaging track 24 during service. Track shoe body 38 further includes a ground-contact surface 48 and a link bolting surface 50 opposite to ground-contact surface 48. Bolt holes 52 extend through track shoe body 38 from ground-contact surface 48 to link bolting surface 50. Bolts 34 are also shown in FIG. 2.

Track shoe 26 further includes a grouser 30 extending between first lateral edge 44 and second lateral edge 46. Grouser 30 includes a grouser edge surface 56, a grouser forward surface 58, and a grouser back surface 60 each extending from grouser edge surface 56 to ground-contact surface 48. Track shoe 26 is also equipped with a compound grouser protector 36, including a plurality of shrouds 62. In the illustrated embodiment, shrouds 62 are three in number, although as further discussed herein a compound grouser protector will typically include from two shrouds to five shrouds. In still other embodiments, a grouser protector might include a single shroud, and would thus not be compound in the sense of that term intended. In the illustrated embodiment grouser 30 defines a lateral grouser length 64 between first lateral edge 44 and second lateral edge 46, and shrouds 62 may each define a shroud length 66 that is from 14% to 28% of lateral grouser length 64, and in a refinement may be from 15% to 27%. In a further refinement, "long" shrouds as further discussed herein may be from 23% to 27% of a lateral grouser length, and "short" shrouds as further discussed herein may be from 16% to 18% of a lateral grouser length. As also further discussed herein, certain sizes of shrouds are contemplated to enable application to a range of grouser lengths, with a number of shrouds needed to shield a desired proportion of grouser length being typically from two to five. According to the present disclosure, and as further discussed herein, a total of two shroud types can be used in some instances to shield grousers in a range of grouser lengths from 610 millimeters to 710 millimeters. The present disclosure is not limited to any particular number of shrouds in a compound grouser protector, however.

Figure 4:
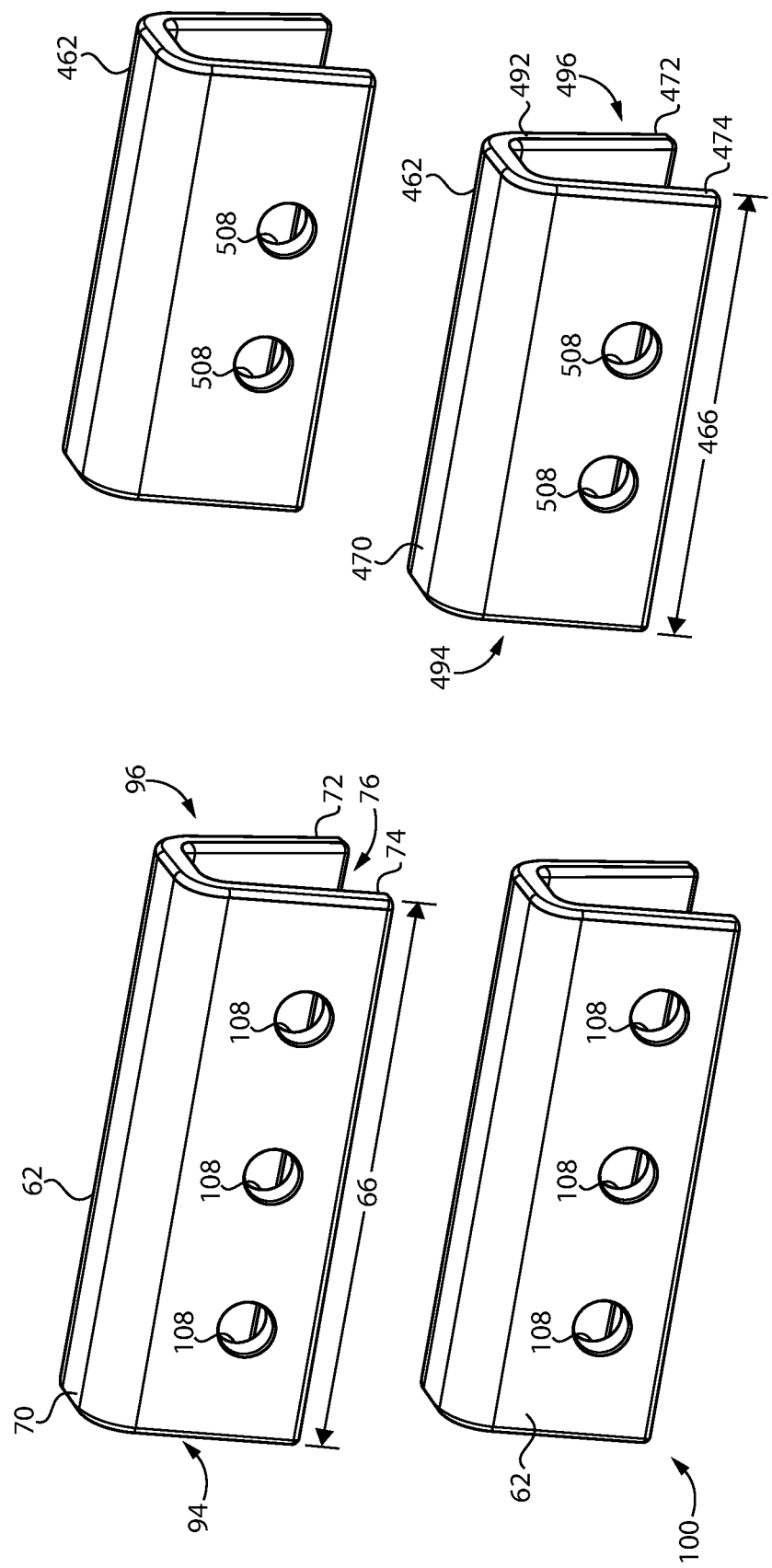
FIG. 4 is a diagrammatic view of shrouds in a grouser shroud inventory, according to one embodiment.

Referring now also to FIG. 4, there is shown a grouser shroud inventory 100, for forming compound grouser protectors typically of three grouser shrouds upon track shoes having different grouser lengths, such as the range from 610 millimeters to 710 millimeters as indicated above. Grouser shroud inventory 100 can include at least one long shroud such as long shroud 62, and typically a plurality of interchangeable long shrouds. The terms "long" and "short" are used herein in a relative sense only, as will be further apparent from the following description. The plurality of interchangeable long shrouds, hereinafter referred to at times in the singular as shroud 62, each include a base 70, a first shroud leg 72, and a second shroud leg 74 extending downwardly from base 70. Grouser shroud inventory 100 may further include at least one short shroud 462, and typically a plurality of interchangeable short shrouds 462, also referred to at times in the singular. Short shrouds 462 each include a base 470, a first shroud leg 472, and a second shroud leg 474 extending downwardly from base 470. Long shroud 62 has a profile fore to aft, as further discussed herein, and short shroud 462 may have a profile fore to aft identical in form to the profile of shroud 62.

As noted above, shroud 62 defines a shroud length or a long shroud length 66. Shroud 462 defines a shroud length or a short shroud length 466. In one embodiment, a shroud according to the present disclosure defines a shroud length from 110 millimeters to 165 millimeters, plus or minus a tolerance at either end of this range of 4 millimeters. This general size range encompasses long shroud 62 and short shroud 462. A ratio of shroud length 66 to shroud length 466 may be from 139% to 162%, and in a refinement the ratio may be 150%. In a further refinement, shroud length 66 is 165 millimeters plus or minus a tolerance of 4 millimeters, and shroud length 466 is 110 millimeters plus or minus a tolerance of 4 millimeters. Grouser shroud inventory 100 could be an inventory kept on hand at a work site, received in a service package, or upon a pallet, and could include any number of interchangeable long shrouds and any number of interchangeable short shrouds, including the example of FIG. 4 where two groups of respectively interchangeable shrouds are provided. In some instances, an inventory could include only shrouds 62, or only shrouds 462, for instance.

Shrouds 62 and 462 can be formed of any suitable material(s) and by any suitable process. In one application shrouds 62 and 462 may be formed by casting, but in other applications are formed by forging. Although applications are contemplated where a compound grouser protector, or a single-shroud grouser protector, according to the present disclosure, is formed of highly abrasive resistant material relative to a track shoe, embodiments are also contemplated where shrouds 62 and 462 are formed of the same or similar material as is the track shoe. In one embodiment, shrouds 62 and 462 are formed of a cast steel or other iron material that is heat treated to desired hardness. The material of which shrouds 62 and 462 are made may have a hardness from 46 Rockwell C to 62 Rockwell C in some instances.

Figure 6:
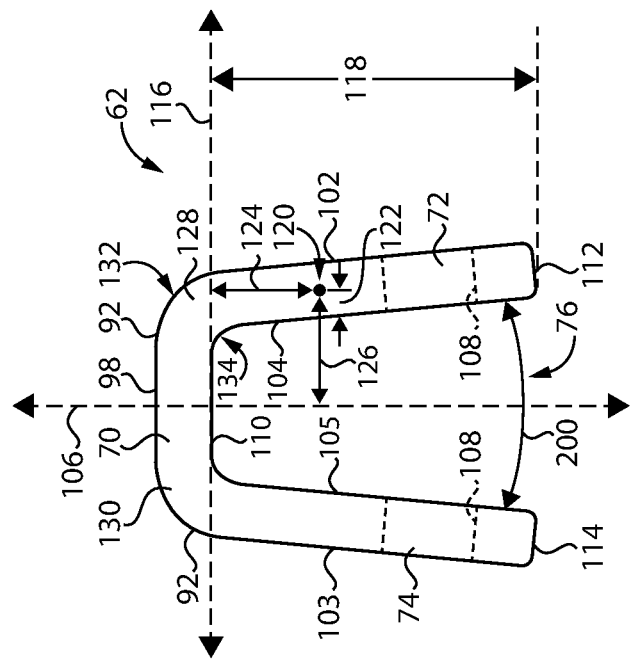
FIG. 6 is an end view of a shroud, according to one embodiment.
Figure 5:
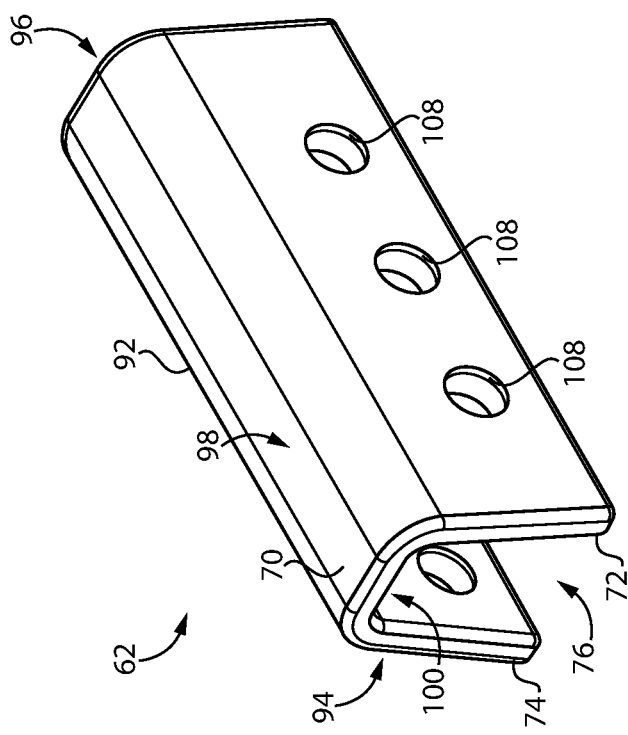
FIG. 5 is a diagrammatic view of a shroud, according to one embodiment.

Referring also now to FIGS. 5 and 6, there are shown features of shroud 62 in further detail. It will be recalled that shroud 462 may have a profile identical in form to a profile of shroud 62. Accordingly, apart from a different length, and number of weld holes as further discussed herein, the description of shroud 62 and illustrations in FIGS. 5 and 6 may be understood by way of analogy to refer to shroud 462. Shroud 62 includes an elongate shroud body 92 having a first shroud end 94 and second shroud end 96. Shroud 462 includes an elongate shroud body 492 having a first shroud end 494 and a second shroud end 496. Each of first shroud leg 72 and second shroud leg 74 extends longitudinally from first shroud end 94 to second shroud end 96. Shroud length 66 is understood also to be defined as a distance from first shroud end 94 to second shroud end 96, and shroud length 466 is analogously defined. Base 70 includes an outside base surface 98, and an inside base surface 110 that is planar and defines a horizontal plane 116. Each of first shroud leg 72 and second shroud leg 74 includes an outside leg surface 102 and 103, respectively, and an inside leg surface 104 and 105, respectively. Each of outside leg surfaces 102 and 103 and inside leg surfaces 104 and 105 may be planar. Outside base surface 98 may also be planar. A thickness of elongate shroud body 92, between inside base surface 110 and outside base surface 98, and between inside leg surfaces 104 and 105 and the respective outside leg surfaces 102 and 103, may be uniform, and in one example is approximately 12 millimeters. A ratio of the thickness in shroud 62 to shroud length 66 may thus be approximately 7% to 7.5%. A ratio of the thickness in shroud 462 to shroud length 466 may thus be approximately 10.5% to 11%. Elongate shroud body 92 may further include a first curved corner section 128 and a second curved corner section 130 transitioning between base 70 and first shroud leg 72 and second shroud leg 74, respectively.

First shroud leg 72 and second shroud leg 74 extend downwardly from base 70. A vertical plane 106 bisects base 70 fore to aft between first shroud leg 72 and second shroud leg 74. Elongate shroud body 92 may have a profile that is symmetric fore to aft about vertical plane 106. As shown in FIG. 6, the fore to aft profile of elongate shroud body 92 may have the form of a flat-crowned arch, about vertical plane 106, providing a flat outer ground-contact surface, and a flat inner surface that contacts a flat grouser outer edge when installed for service on a track shoe. It can further be seen that first shroud leg 72 and second shroud leg 74 flare outwardly from base 70, relative to vertical plane 106, and define a grouser opening 76, also symmetric fore to aft for fitting shroud 62 upon a grouser in a track shoe. An angle 200 is formed between first shroud leg 72 and second shroud leg 74, also understood as an opening angle of grouser opening 76. Angle 200 may be greater than 10°, and in some embodiments may be from 10° to 11°. A shroud inside height dimension 118 extends parallel to vertical plane 106 between inside base surface 110 and each of first longitudinal peripheral edge 112 and second longitudinal peripheral edge 114. In an implementation, a grouser opening dimension extending fore to aft between first longitudinal peripheral edge 112 and second longitudinal peripheral edge 114 may be smaller than grouser inside height dimension 118, reflecting proportions that shield a desired grouser height when shroud 62 is installed for service upon a track shoe but leave clearance between the shroud legs and ground-contact surface of the track shoe to facilitate shroud removal.

Weld holes 108 are formed in each of first shroud leg 72 and second shroud leg 74. Weld holes 108 extend between the respective outside leg surface 102 and 103 and inside leg surface 104 and 105. Weld holes 108 can assist in production of plug welds when shroud 62 is attached to a grouser for service. Weld holes 508 in shroud 462 are shown in FIG. 4. In the illustrated embodiment a total of three weld holes 108 are formed in each shroud leg of shroud 62, and a total of two weld holes is formed in each shroud leg of shroud 462. A number of weld holes in any shroud herein may be from one to five in total. Also in a practical implementation strategy, weld holes 108 in each of first shroud leg 72 and second shroud leg 74 include longitudinally spaced through-holes arranged inboard of the respective first longitudinal peripheral edge 112 and second longitudinal peripheral edge 114. It can be further seen from the drawings that weld holes 48 are biased in distribution closer to the respective first longitudinal peripheral edge 112 and second longitudinal peripheral edge 114 than to base 70. The present description of weld holes 108 can be understood by way of analogy to refer to weld holes 508 in shroud 462. As also depicted in FIG. 6, first curved corner section 128 defines an outside radius 132 and an inside radius 134. Outside radius 132 may be larger than inside radius 134. Second curved corner section 130 may be analogously configured.

With continued reference to FIG. 6, it will be recalled that shroud inside height dimension 118 extends vertically between inside base surface 110 and first longitudinal peripheral edge 112. Shroud inside height dimension 118 is defined by a location of horizontal plane 116 and also by a location of first shroud leg 72 that is a terminal location and thus furthest from horizontal plane 116. A datum point 120 is defined at a location within first shroud leg 72 at a vertical distance 124 from horizontal plane 116 that is 43% of shroud inside height dimension 118. Datum point 120 is also defined at a wall thickness distance 122 from inside leg surface 104 that is 20% of vertical distance 124. Datum point 120 may be half-way between outside leg surface 102 and inside leg surface 104. A fore to aft distance 126 between datum point 120 and vertical plane 106 may be greater than 37% of shroud inside height dimension 118. Weld holes 108 may be located, in first shroud leg 72, vertically between datum point 120 and longitudinal peripheral edge 112. It will be understood that description of datum point 120 could be applied to a second datum point analogously defined on an opposite side of elongate shroud body 92, where elongate shroud body 92 has a symmetric fore to aft profile about vertical plane 106.

It will further be recalled that shroud 62, and by way of analogy shroud 462, is configured for fitting upon a grouser. Shroud 62 may be similar in form, with respect to an inside profile thereof, to an outside profile of a grouser upon which shroud 62 is to be fitted. It will generally be desirable, however, for shroud 62 to be removable from a grouser once worn and swapped out for a replacement shroud. Accordingly, shroud 62 may be just slightly larger fore to aft than the grouser upon which it is to be fitted. The dimensional and proportional attributes described in connection with datum point 120 and other features herein, define a relative sizing of elongate shroud body 92 that may be just larger than certain grousers so as to provide an inside clearance between forward and back grouser surfaces and inside leg surfaces 104 and 105. In some instances, a clearance between forward and back grouser surfaces and inside leg surfaces 104 and 105 may be about 1 millimeter when shroud 62 is installed. Weld holes 108 may be used to provide for plug welds therein that attach shroud 62 to a grouser. A relatively tiny clearance in combination with the positioning, number, and distribution of plug welds in weld holes 108 can assist in removing shroud 62 in anticipation of replacement with a new shroud. A grinder, a pry bar, or other removal tool can be positioned just under one or both of longitudinal peripheral edges 112 and 114 to facilitate shroud removal. In some embodiments, shroud 62 can be attached to a grouser solely by way of plug welds within weld holes 108. In other instances, peripheral welds at the opposite ends of the elongate shroud bodies or even along the longitudinal peripheral edges thereof could be used.

INDUSTRIAL APPLICABILITY

Figure 7A:
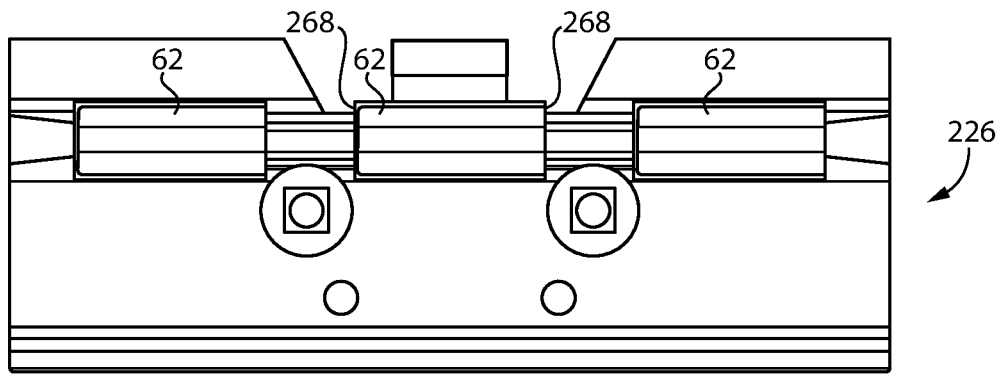
FIG. 7a is a diagrammatic view of a track shoe, equipped with shrouds, according to the present disclosure.
Figure 7B:
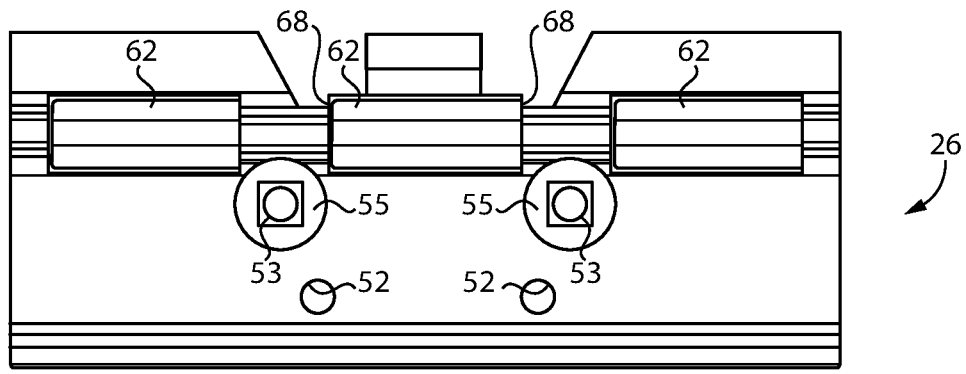
FIG. 7b is a diagrammatic view of a track shoe, equipped with shrouds, according to the present disclosure.
Figure 7C:
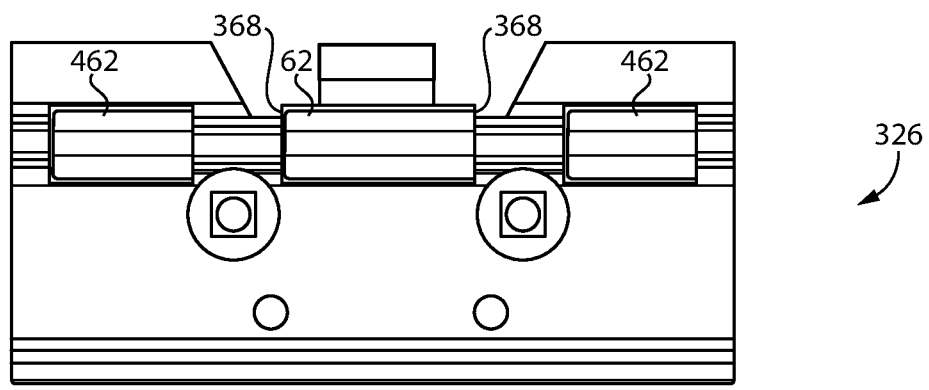
FIG. 7c is a diagrammatic view of a track shoe, equipped with shrouds, according to the present disclosure

Referring to the drawings generally, but also now to FIGS. 7a, 7b, and 7c, it will be recalled that shrouds in inventory 100 can be used in different assembly combinations upon track shoes having a range of grouser sizes. In FIG. 7b track shoe 26 is shown as it might appear equipped with three of shrouds 62, with each of shrouds 62 separated by gaps 68. Track shoe 26 can include a grouser width of 710 millimeters, corresponding to a full shoe width also of 710 millimeters. Shrouds 62 may be spaced by gaps 68 to accommodate installation/deinstallation tools for bolts 53 and washers 55 attaching track shoe 226 to track links in a ground-engaging track system.

FIG. 7a also illustrates another track shoe 226 that includes three of shrouds 62, separated by gaps 268. Track shoe 226 may have a full shoe width of 760 millimeters, and a grouser width less than 760 millimeters as outside ends of the grouser may be clipped. FIG. 7c further illustrates a track shoe 326 having one of shrouds 62 and two of shrouds 462, separated by gaps 368. Track shoe 326 might be a track shoe having a width of 610 millimeters and a grouser width also of 610 millimeters.

From the foregoing description it will be appreciated that different assembly combinations of a total of two types of shrouds can be provided to shield grousers having lengths from 610 millimeters to 710 millimeters. The illustrated combinations include three equal length shrouds as in the case of track shoe 26 and track shoe 226, and one long shroud and two short shrouds as in the case of track shoe 326. Limiting a total number of different shrouds required can optimize installation and/or removal time. Weld hole numbers cooperate with shroud lengths herein to further limit time required for shroud installation and/or removal without sacrificing field performance or ease of shroud removal.

The present description is for illustrative purpose only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A shroud for a track shoe grouser protector in a ground-engaging track system comprising:
    an elongate shroud body having a first shroud end and a second shroud end, and including a base, and a first shroud leg and a second shroud leg, each extending longitudinally from the first shroud end to the second shroud end;
    the base including an outside base surface, and an inside base surface that is planar and defines a horizontal plane, and each of the first shroud leg and the second shroud leg including an outside leg surface and an inside leg surface;
    the first shroud leg and the second shroud leg extending downwardly from the base, and a vertical plane bisects the base fore and aft between the first shroud leg and the second shroud leg, and the elongate shroud body has a profile that is symmetric fore to aft about the vertical plane;
    the first shroud leg and the second shroud leg flare outwardly from the base, relative to the vertical plane, and define a grouser opening, for fitting the shroud upon a grouser in a track shoe; and
    weld holes are formed in each of the first shroud leg and the second shroud leg and extend between the respective outside leg surface and inside leg surface.

2. The shroud of claim 1 wherein:
    the first shroud leg includes a first longitudinal peripheral edge, and the second shroud leg includes a second longitudinal peripheral edge; and
    the weld holes in each of the first shroud leg and the second shroud leg include longitudinally spaced through-holes arranged inboard of the respective first longitudinal peripheral edge and second longitudinal peripheral edge.

3. The shroud of claim 2 wherein a number of the weld holes in each of the first shroud leg and the second shroud leg is from two to five.

4. The shroud of claim 2 wherein an angle formed between the first shroud leg and the second shroud leg is from 10° to 11°.

5. The shroud of claim 2 wherein:
    a shroud inside height dimension extends between the inside base surface and the first longitudinal peripheral edge;
    a datum point is defined at a location within the first shroud leg at a vertical distance from the horizontal plane that is 43% of the shroud inside height dimension, and at a wall thickness distance from the respective inside leg surface that is 20% of the vertical distance; and
    a fore to aft distance between the datum point and the vertical plane is greater than 37% of the shroud inside height dimension.

6. The shroud of claim 5 wherein the weld holes in the first shroud leg are located vertically between the datum point and the first longitudinal peripheral edge.

7. The shroud of claim 6 wherein:
    a thickness of the elongate shroud body, between the inside base surface and the outside base surface, and between the inside leg surfaces and the respective outside leg surfaces, is uniform; and the elongate shroud body is formed throughout of a material having a hardness from 46 Rockwell C to 52 Rockwell C.

8. The shroud of claim 5 wherein the elongate shroud body defines a shroud length extending from the first shroud end to the second shroud end from 110 millimeters to 165 millimeters, plus or minus a tolerance of 4 millimeters.

9. The shroud of claim 1 wherein:
each of the outside base surface and the outside leg surfaces is planar; and
the elongate shroud body further including a first curved corner section and a second curved corner section transitioning between the base and the first shroud leg and the second shroud leg, respectively.

10. A shroud for a track shoe grouser protector in a ground-engaging track system comprising:
an elongate shroud body having a first shroud end and a second shroud end, and including a base, and a first shroud leg and a second shroud leg, each extending longitudinally from the first shroud end to the second shroud end;
the base including an outside base surface, and an inside base surface that is planar and defines a horizontal plane, and each of the first shroud leg and the second shroud leg including an outside leg surface and an inside leg surface;
the first shroud leg and the second shroud leg extending downwardly from the base to a first longitudinal peripheral edge and a second longitudinal peripheral edge, respectively, and a vertical plane bisects the base fore and aft between the first shroud leg and the second shroud leg;
the elongate shroud body forms a fore to aft profile about the vertical plane having the form of a flat-crowned arch; and
the elongate shroud body further including a first corner section transitioning between the base and the first shroud leg, and a second corner section transitioning between the base and the second shroud leg, and the outside base surface is continuous fore and aft from the first shroud leg to the second shroud leg and longitudinally from the first shroud end to the second shroud end.

11. The shroud of claim 10 wherein the first shroud leg and the second shroud leg flare outwardly from the base, relative to the vertical plane, and define a grouser opening that is symmetric fore to aft about the vertical plane, for fitting the shroud upon a grouser in a track shoe.

12. The shroud of claim 10 wherein:
the elongate shroud body includes a shroud inside height dimension, and a grouser opening dimension extending fore to aft between the first longitudinal peripheral edge and the second longitudinal peripheral edge; and
the shroud inside height dimension is greater than the grouser opening dimension.

13. The shroud of claim 12 wherein weld holes are formed in each of the first shroud leg and the second shroud leg and are biased in distribution closer to the respective first longitudinal peripheral edge and second longitudinal peripheral edge than to the base.

14. The shroud of claim 13 wherein the weld holes include a total of two to five through-holes in each of the first shroud leg and the second shroud leg arranged inboard of the respective first longitudinal peripheral edge and second longitudinal peripheral edge.

15. The shroud of claim 10 wherein:
each of the outside base surface and the outside leg surfaces is planar, and the first corner section includes a first curved corner section and the second corner section includes a second curved corner section transitioning between the base and the first shroud leg and the second shroud leg, respectively; and
the curved corner sections define outside radiuses of curvature, and inside radiuses of curvature that are smaller than the corresponding outside radiuses of curvature.

16. The shroud of claim 15 wherein an opening angle of the grouser opening is greater than 10°.

17. A track shoe grouser shroud inventory comprising:
a long shroud including a base, a first shroud leg and a second shroud leg extending downwardly from the base, a grouser opening formed between the first shroud leg and the second shroud leg, and defining a long shroud length from a first shroud end to a second shroud end;
a short shroud including a base, a first shroud leg and a second shroud leg extending downwardly from the base, a grouser opening formed between the respective first shroud leg and second shroud leg, and defining a short shroud length from a first shroud end to a second shroud end;
the long shroud having a profile that is symmetric fore to aft about a vertical plane bisecting the base between the respective first leg and second leg, and the short shroud having a profile identical in form to the profile of the long shroud; and
a ratio of the long shroud length to the short shroud length is from 139% to 162%.

18. The grouser shroud inventory of claim 17 wherein:
the first shroud leg and the second shroud leg in the long shroud each have formed therein a plurality of weld holes; and
the first shroud leg and the second shroud leg in the long shroud are flared outward relative to the vertical plane.

19. The grouser shroud inventory of claim 18 wherein:
an angle formed between the first shroud leg and the second shroud leg in the long shroud is from 10° to 11°;
each of the first shroud leg and the second shroud leg in the long shroud includes a longitudinal peripheral edge; and
the plurality of weld holes includes a total of two to five longitudinally spaced through-holes arranged inboard of the respective longitudinal peripheral edge.

20. The grouser shroud inventory of claim 17 wherein the long shroud is one of a plurality of interchangeable long shrouds each having a shroud length of 165 millimeters plus or minus a tolerance of 4 millimeters, and the short shroud is one of a plurality of interchangeable short shrouds each having a shroud length of 110 millimeters plus or minus a tolerance of 4 millimeters.

* * * * *